United States Patent
Wang et al.

(10) Patent No.: US 10,652,760 B2
(45) Date of Patent: May 12, 2020

(54) MULTI-USER MULTIPLEXING FRAME STRUCTURE FOR EMTC

(71) Applicant: QUALCOMM Incorporated, San Diego, CA (US)

(72) Inventors: Renqiu Wang, San Diego, CA (US); Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/202,023

(22) Filed: Jul. 5, 2016

(65) Prior Publication Data

US 2017/0013481 A1    Jan. 12, 2017

Related U.S. Application Data

(60) Provisional application No. 62/190,248, filed on Jul. 8, 2015.

(51) Int. Cl.
*H04W 24/02* (2009.01)
*H04W 4/70* (2018.01)
(Continued)

(52) U.S. Cl.
CPC ............ *H04W 24/02* (2013.01); *H04B 1/713* (2013.01); *H04B 3/36* (2013.01); *H04B 7/0413* (2013.01);
(Continued)

(58) Field of Classification Search
CPC ......... H04W 24/02; H04B 1/713; H04B 3/36; H04B 7/0413
See application file for complete search history.

(56) References Cited

U.S. PATENT DOCUMENTS

2008/0159323 A1* 7/2008 Rinne .................. H04L 1/0004
370/431
2008/0310540 A1* 12/2008 Tiirola .................... H04J 13/00
375/267
(Continued)

FOREIGN PATENT DOCUMENTS

WO    WO-2013056741 A1    4/2013

OTHER PUBLICATIONS

Institute for Information Industry (III): "MTC coverage Improvement Through Spreading Code", 3GPP Draft, R1-131104, 3rd Generation Partnership Project (3GPP), Mobile Competence Centre, 650, Route Des Lucioles, F-06921 Sophia-Antipolis Cedex, France, vol. RAN WG1, No. Chicago, USA, Apr. 15, 2013-Apr. 19, 2013, Apr. 5, 2013 (Apr. 5, 2013), 4 Pages, XP050696750, Retrieved from the Internet: URL: http://www.3gpp.org/ftp/tsg_ran/WG1_RL1/TSGR1_72b/Docs/ [retrieved on Apr. 5, 2013].
(Continued)

*Primary Examiner* — Jael M Ulysse
(74) *Attorney, Agent, or Firm* — Patterson & Sheridan, L.L.P./Qualcomm Incorporated

(57) ABSTRACT

Certain aspects of the present disclosure generally relate to wireless communications, and more specifically increasing user capacity through a frame structure which supports eMTC UL multi-user multiplexing. According to aspects, a UE may identify at least one narrowband region within a wider system bandwidth, determine at least one parameter assigned to the UE for transmitting symbols of a physical uplink channel in the narrowband region that are multiplexed with symbols transmitted by one or more other UEs, and transmit the physical uplink channel using the at least one determined parameter.

30 Claims, 9 Drawing Sheets

(51) Int. Cl.
| | |
|---|---|
| *H04B 1/713* | (2011.01) |
| *H04J 13/00* | (2011.01) |
| *H04B 3/36* | (2006.01) |
| *H04B 7/0413* | (2017.01) |
| *H04J 11/00* | (2006.01) |
| *H04L 5/00* | (2006.01) |
| *H04W 8/08* | (2009.01) |
| *H04W 16/32* | (2009.01) |
| *H04W 72/04* | (2009.01) |
| *H04W 88/02* | (2009.01) |
| *H04W 88/08* | (2009.01) |
| *H04W 88/12* | (2009.01) |

(52) U.S. Cl.
CPC .............. *H04J 11/00* (2013.01); *H04J 13/00* (2013.01); *H04J 13/0044* (2013.01); *H04L 5/0051* (2013.01); *H04W 4/70* (2018.02); *H04W 8/082* (2013.01); *H04W 16/32* (2013.01); *H04W 72/0413* (2013.01); *H04W 72/0453* (2013.01); *H04W 72/0473* (2013.01); *H04J 2011/0003* (2013.01); *H04W 88/02* (2013.01); *H04W 88/08* (2013.01); *H04W 88/12* (2013.01)

(56) References Cited

U.S. PATENT DOCUMENTS

| | | | | |
|---|---|---|---|---|
| 2009/0116599 A1* | 5/2009 | McCoy | ................ | H04J 11/0056 375/362 |
| 2009/0232065 A1* | 9/2009 | Zhang | ................... | H04L 5/0053 370/329 |
| 2009/0274086 A1* | 11/2009 | Petrovic | ............... | H04J 11/0093 370/312 |
| 2010/0074210 A1* | 3/2010 | Gaal | ........................ | H04J 13/00 370/329 |
| 2011/0007778 A1* | 1/2011 | Kishiyama | ............. | H04B 1/713 375/133 |
| 2011/0201341 A1* | 8/2011 | Choudhury | ....... | H04W 72/0426 455/450 |
| 2011/0242997 A1* | 10/2011 | Yin | ....................... | H04L 1/0031 370/252 |
| 2012/0155412 A1* | 6/2012 | Kawamura | ............ | H04J 11/003 370/329 |
| 2012/0201120 A1* | 8/2012 | Zhang | ................... | H04L 1/1671 370/203 |
| 2012/0294273 A1* | 11/2012 | Ahn | ...................... | H04L 1/0028 370/329 |
| 2013/0083753 A1* | 4/2013 | Lee | ....................... | H04L 1/0026 370/329 |
| 2013/0294399 A1* | 11/2013 | Lee | ......................... | H04W 4/70 370/330 |
| 2014/0198742 A1* | 7/2014 | Baldemair | ........ | H04W 74/0833 370/329 |
| 2015/0016377 A1* | 1/2015 | Kim | ..................... | H04B 7/2615 370/329 |
| 2016/0081084 A1* | 3/2016 | Blankenship | ........... | H04W 4/70 370/329 |
| 2016/0127936 A1* | 5/2016 | Chatterjee | ............ | H04B 7/0626 370/252 |
| 2016/0183243 A1* | 6/2016 | Park | .................. | H04W 72/0413 370/329 |
| 2016/0302092 A1* | 10/2016 | Sartori | ..................... | H04L 5/00 |

OTHER PUBLICATIONS

International Search Report and Written Opinion—PCT/US2016/041039—ISA/EPO—dated Sep. 26, 2016.
NEC: "Performance of Uplink frequency hopping for LTE Rel-13 MTC", 3GPP Draft, R1-150288, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9, 2015-Feb. 13, 2015, Feb. 8, 2015 (Feb. 8, 2015), 4 Pages, XP050933498, Retrieved from the Internet: URL: http://www.3gpp.org/ftp/Meetings_3GPP_SYNC/RAN1/Docs/ [retrieved on Feb. 8, 2015].
NEC: "Uplink Reference Signal Enhancement for Low Cost MTC", 3GPP Draft, R1-140417, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Feb. 10, 2014-Feb. 14, 2014, 31, Jan. 2014 (Jan. 31, 2014), pp. 1-4, XP050751640, Retrieved from the Internet: URL: http://www.3gpp.org/ftp/tsg_ran/WG1_RL 1/TSG R1_76/Docs/ [retrieved on Jan. 31, 2014].
Panasonic: "Multiple Subframe Code Spreading for MTC UEs", 3GPP Draft, R1-152913_CLEAN, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 15, 2015 (May 15, 2015), pp. 1-7, XP050971782, Retrieved from the Internet: URL: http://www.3gpp.org/ftp/tsg_ran/WG1_RL1/TSGR1_81/Docs/ [retrieved on May 15, 2015].
Renesas Mobile Europe Ltd: "Physical Channels Coverage Enhancements for MTC (R1-130423)", 3GPP Draft, vol. RAN WG1, No. #72 Jan. 19, 2013 (Jan. 19, 2013), XP050663706, 6 Pages, 3rd Generation Partnership Project (3GPP), Mobile Competence Centre, 650, Route Des Lucioles, F-06921 Sophia-Antipolis Cedex, France Retrieved from the Internet: URL: http://www.3gpp.org/ftp/tsg_ran/WG1_RL1/TSGR1_72/Docs/ [retrieved on Jan. 19, 2013] section 2.3.

* cited by examiner

MULTI-USER MULTIPLEXING FRAME STRUCTURE FOR EMTC

CROSS REFERENCE TO RELATED APPLICATIONS

This application claims benefit of U.S. Provisional Application Ser. No. 62/190,248, filed Jul. 8, 2015 entitled "MULTI-USER MULTIPLEXING FRAME STRUCTURE FOR eMTC," which is hereby expressly incorporated by reference herein in its entirety.

FIELD OF THE INVENTION

Certain aspects of the present disclosure generally relate to wireless communications, and more specifically to a frame structure which supports multi-user multiplexing for machine type communication (MTC) devices and enhanced MTC (eMTC) devices.

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs and/or evolved MTC UEs, which may include remote devices, such as sensors, meters, monitors, location tags, drones, trackers, robots, etc., that may communicate with a base station (BS), evolved Node B (eNB) another remote device, or some other entity. MTC may refer to communication involving at least one remote device on at least one end of the communication and may include forms of data communication which involve one or more entities that do not necessarily need human interaction. MTC UEs and eMTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment. The method generally includes identifying at least one narrowband region within a wider system bandwidth, determining at least one parameter assigned to the UE for transmitting symbols of a physical uplink channel in the narrowband region that are multiplexed with symbols transmitted by one or more other UEs, and transmitting the physical uplink channel using the at least one determined parameter.

As will be described in more detail herein, the at least one parameter may comprise at least one of a cyclic shift or a spreading code. The at least one parameter may take a value that indicates a spreading factor. When the parameter comprises a cyclic shift, the UE may transmit the physical uplink channel by applying the cyclic shift to transmit reference signals (RSs) in one or more symbols of the physical uplink channel. When the parameter comprises a spreading code, the UE may transmit the physical uplink channel by applying the spreading code to transmit reference signals (RSs) in multiple symbols of the physical uplink channel. Additionally or alternatively, when the parameter comprise a spreading code, the UE may transmit the physical uplink channel by applying the spreading code to transmit data symbols in multiple symbols of the physical uplink channel.

According to aspects, the parameter may comprise a configurable spreading factor (SF) based, at least in part, on a format of a subframe of the physical uplink channel, a bundling size, or a coverage enhancement (CE) level. The UE may transmit the physical uplink channel by applying the SF to transmit multiple symbols of the physical uplink channel.

Determining the at least one parameter assigned to the UE for transmitting symbols of the physical uplink channel in the narrowband region may include identifying a subframe hopping pattern and transmitting the physical uplink channel by applying a spreading factor to transmit the physical uplink channel using a first frequency in a first subframe and subsequently using a second frequency in a second subframe within the narrowband region, wherein the first and second frequencies may be determined based on the hopping pattern. The spreading factor may be based, at least in part, on a time to retune from the first frequency to the second frequency. Retuning from the first frequency to the second frequency may occur during at least one of a last one or more symbols of the first subframe or a first one or more symbols of the second subframe.

Determining the at least one parameter assigned to the UE for transmitting symbols of the physical uplink channel in the narrowband region may include identifying a slot-based hopping pattern. Transmitting the physical uplink channel may include applying a spreading factor to transmit the physical uplink channel on a first frequency in a first slot of a subframe and subsequently on a second frequency in a second slot of the subframe within the narrowband region, wherein the first and second frequencies may be determined based on the hopping pattern. The spreading factor may be based, at least in part, on a time to retune from the first frequency to the second frequency within the subframe (e.g., time to retune between the first and second slot of the subframe).

The UE may transmit the physical uplink channel by applying a spreading code to transmit one of: reference signals (RSs) or data symbols in multiple symbols of a subframe of the physical uplink channel or across multiple subframes of the physical uplink channel.

The at least one parameter assigned to the UE may include a spreading factor (SF) equal to or greater than 1. According to aspects, only the UE may be scheduled for transmission on a resource block on the physical uplink channel when the SF is equal to or greater than 1.

According to aspects, the at least one parameter may include a cyclic shift and may further include a spreading code. Transmitting the physical uplink channel may include applying the spreading code and the cyclic shift to transmit reference the signals (RSs) in multiple symbols of the physical uplink channel.

Certain aspects of the present disclosure provide a method for wireless communications by an evolved Node B (eNB). The method generally includes identifying at least one narrowband region within a wider system bandwidth, assigning at least one parameter to a user equipment (UE) for transmission of symbols of a physical uplink channel in the narrowband region that are multiplexed with symbols transmitted by one or more other UEs, and receiving, from the UE, the physical uplink channel using the at least one assigned parameter.

According to aspects, the at least one parameter may include a cyclic shift. Receiving the physical uplink channel, by the eNB, may include receiving reference signals (RSs) with the cyclic shift applied in one or more symbols of the physical uplink channel.

According to aspects, the at least one parameter may include a spreading code. Receiving the physical uplink channel, by the eNB, may include receiving reference signals (RSs) with the spreading code applied in multiple symbols of the physical uplink channel. Receiving the physical uplink channel, by the eNB, may include receiving data symbols with the spreading code applied in multiple symbols of the physical uplink channel.

According to aspects, the at least one parameter may include a configurable spreading factor (SF) based, at least in part, on a format of a subframe of the physical uplink channel, a bundling size, or a coverage enhancement (CE) level. Receiving the physical uplink channel, by the eNB, may include receiving multiple symbols of the physical uplink channel with the SF applied.

According to aspects, assigning the at least one parameter to a UE may include assigning a subframe hopping pattern and receiving the physical uplink channel may include receiving the physical uplink channel with a spreading factor (SF) applied on a first frequency in a first subframe and subsequently on a second frequency in a second subframe within the narrowband region, the first and second frequencies determined based on the subframe hopping pattern. The spreading factor may be based, at least in part, on a time for the UE to retune from the first frequency to the second frequency. Retuning from the first frequency to the second frequency may occur during at least one of a last one or more symbols of the first subframe or a first one or more symbols of the second subframe.

According to aspects, the assigning the at least one parameter to a UE may include identifying a slot-based hopping pattern and receiving the physical uplink channel may include receiving the physical uplink channel with a spreading factor (SF) applied on a first frequency in a first slot of a subframe and subsequently on a second frequency in a second slot of the subframe within the narrowband region, wherein the first and second frequencies determined based on the hopping pattern. The spreading factor may be based, at least in part, on a time for the UE to retune from the first frequency to the second frequency within the subframe.

According to aspects, receiving the physical uplink channel, by the eNB, may include receiving one of reference signals (RSs) or data symbols in multiple symbols of a subframe of the physical uplink channel or across multiple subframes of the physical uplink channel with a spreading code applied.

The at least one parameter assigned to the UE may include a spreading factor (SF) equal to or greater than 1. The eNB may schedule only the UE for transmission on a resource block on the physical uplink channel when the SF is equal to or greater than 1.

Certain aspects of the present disclosure provide an apparatus for wireless communication by a user equipment (UE). The apparatus generally includes means for identifying at least one narrowband region within a wider system bandwidth, means for determining at least one parameter assigned to the UE for transmitting symbols of a physical uplink channel in the narrowband region that are multiplexed with symbols transmitted by one or more other UEs, and means for transmitting the physical uplink channel using the at least one determined parameter.

Certain aspects of the present disclosure provide an apparatus for wireless communication by an evolved Node B (eNB). The apparatus generally includes means for identifying at least one narrowband region within a wider system bandwidth, means for assigning at least one parameter to a user equipment (UE) for transmission of symbols of a physical uplink channel in the narrowband region that are multiplexed with symbols transmitted by one or more other UEs, and means for receiving, from the UE, the physical uplink channel using the at least one assigned parameter.

Certain aspects of the present disclosure provide an apparatus for wireless communication by a user equipment (UE). The apparatus generally includes at least one processor and a memory coupled with the at least one processor. The at least one processor is generally configured to identify at least one narrowband region within a wider system bandwidth, determine at least one parameter assigned to the UE for transmitting symbols of a physical uplink channel in the narrowband region that are multiplexed with symbols transmitted by one or more other UEs, and transmit the physical uplink channel using the at least one determined parameter.

Certain aspects of the present disclosure provide an apparatus for wireless communication by an evolved Node B (eNB). The apparatus generally includes at least one processor and a memory coupled with the at least one processor. The at least one processor is generally configured to identify at least one narrowband region within a wider system bandwidth, assign at least one parameter to a user equipment (UE) for transmission of symbols of a physical uplink channel in the narrowband region that are multiplexed with symbols transmitted by one or more other UEs, and receive, from the UE, the physical uplink channel using the at least one assigned parameter.

Certain aspects of the present disclosure provide a computer readable medium storing computer executable code for causing a user equipment (UE) to identify at least one narrowband region within a wider system bandwidth, determine at least one parameter assigned to the UE for transmitting symbols of a physical uplink channel in the narrowband region that are multiplexed with symbols transmitted by one or more other UEs, and transmit the physical uplink channel using the at least one determined parameter.

Certain aspects of the present disclosure provide a computer readable medium storing computer executable code for causing an evolved Node B (eNB) to identify at least one narrowband region within a wider system bandwidth, assign at least one parameter to a user equipment (UE) for transmission of symbols of a physical uplink channel in the narrowband region that are multiplexed with symbols transmitted by one or more other UEs, and receive, from the UE, the physical uplink channel using the at least one assigned parameter.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for enhancing coverage for devices with limited communication resources, such as machine type communication (MTC) devices, enhanced MTC (eMTC) devices, etc. A design challenge for eMTC devices may exist based, at least in part, on not having enough dimensions/resources (e.g., in a 1 resource block (RB) design, where a RB may include 12 consecutive subcarriers in the frequency domain by 1 slot period in the time domain) to support multiple users. Aspects described herein facilitate a frame structure for uplink multi-user multiplexing.

As will be described in more detail herein, aspects of the present disclosure may increase user capacity while remaining consistent with LTE numerology, providing a flexible spreading factor adjustment for balancing user capacity and data rates, improving tracking loop with eNB scheduling, providing orthogonality between users, and improving user capacity without reducing a data rate or transport block size.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

An Example Wireless Communications System

Figure 1:
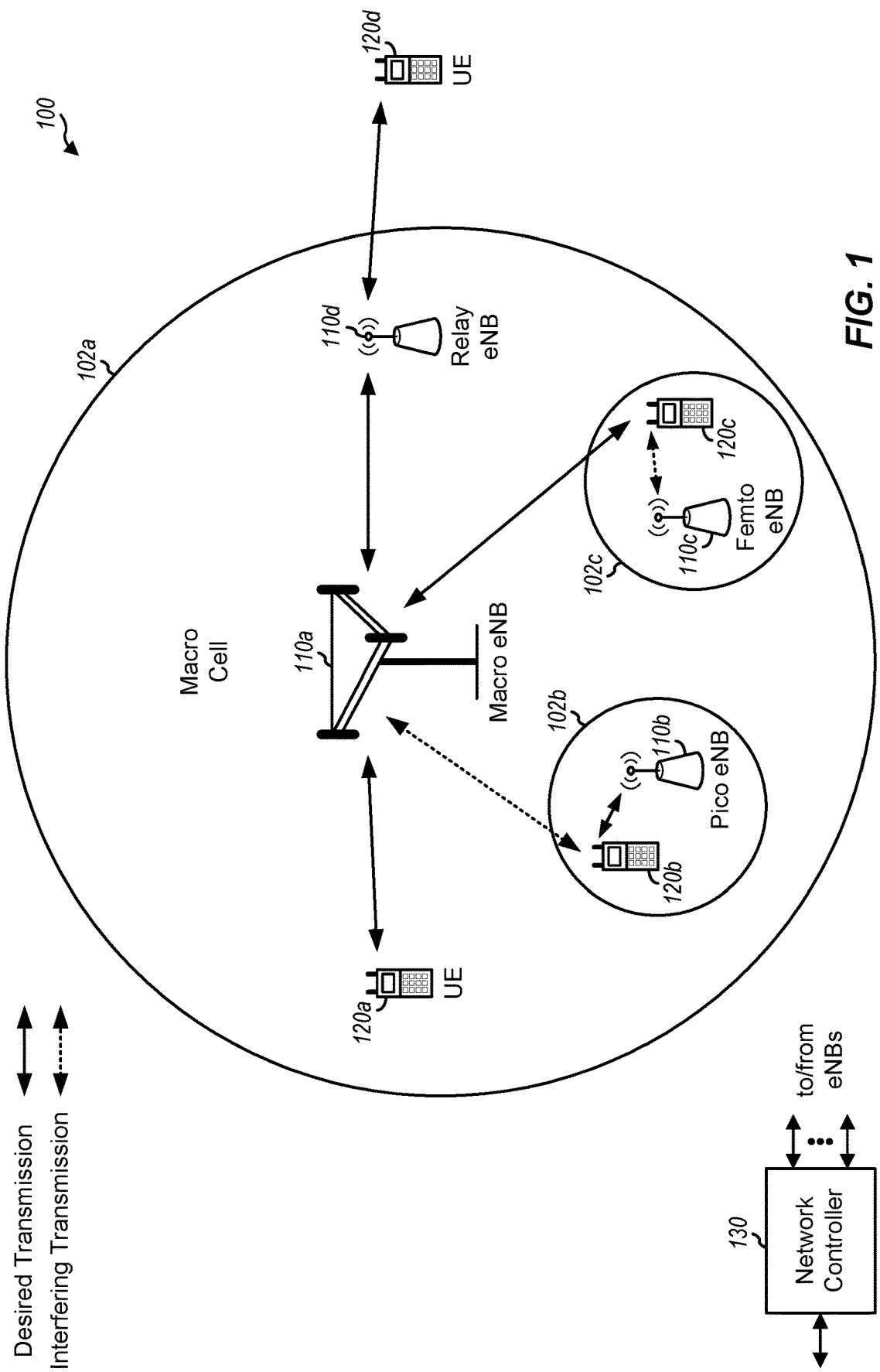
FIG. 1 illustrates an example wireless communication network, in accordance with certain aspects of the present disclosure.

FIG. 1 illustrates an example wireless communication network 100 including evolved Node Bs (eNBs) and user equipments (UEs), in which aspects of the present disclosure may be practiced.

As described herein, UEs and eNBs may operate in a network 100 using a frame structure which supports multi-user uplink multiplexing in at least one narrowband region of a wider system bandwidth. A UE may identify at least one narrowband region within a wider system bandwidth, determine at least one parameter assigned to the UE for transmitting symbols of a physical uplink channel in the narrowband region that are multiplexed with symbols transmitted by one or more other UEs, and transmit the physical uplink channel using the at least one determined parameter.

Correspondingly, an eNB may identify at least one narrowband region within a wider system bandwidth, assign at least one parameter to a UE for transmission of symbols of a physical uplink channel in the narrowband region that are multiplexed with symbols transmitted by one or more other UEs and receive, from the UE, the physical uplink channel using the at least one assigned parameter. As described herein a parameter may indicate one or more of a cyclic shift, spreading code, spreading factor, a subframe hopping pattern, or a slot-based hopping pattern for UL transmissions by a UE.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station (BS), a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB," "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

One or more UEs 120 in the wireless communication network 100 (e.g., an LTE network) may also be low cost (LC), low data rate devices, e.g., such as MTC UEs, eMTC UEs, etc. The UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. Devices with limited communication resources, such as MTC devices, eMTC devices, etc. may be referred to generally as LC UEs. Similarly, legacy devices, such as legacy and/or advanced UEs (e.g., in LTE) may be referred to generally as non-LC UEs.

Figure 2:
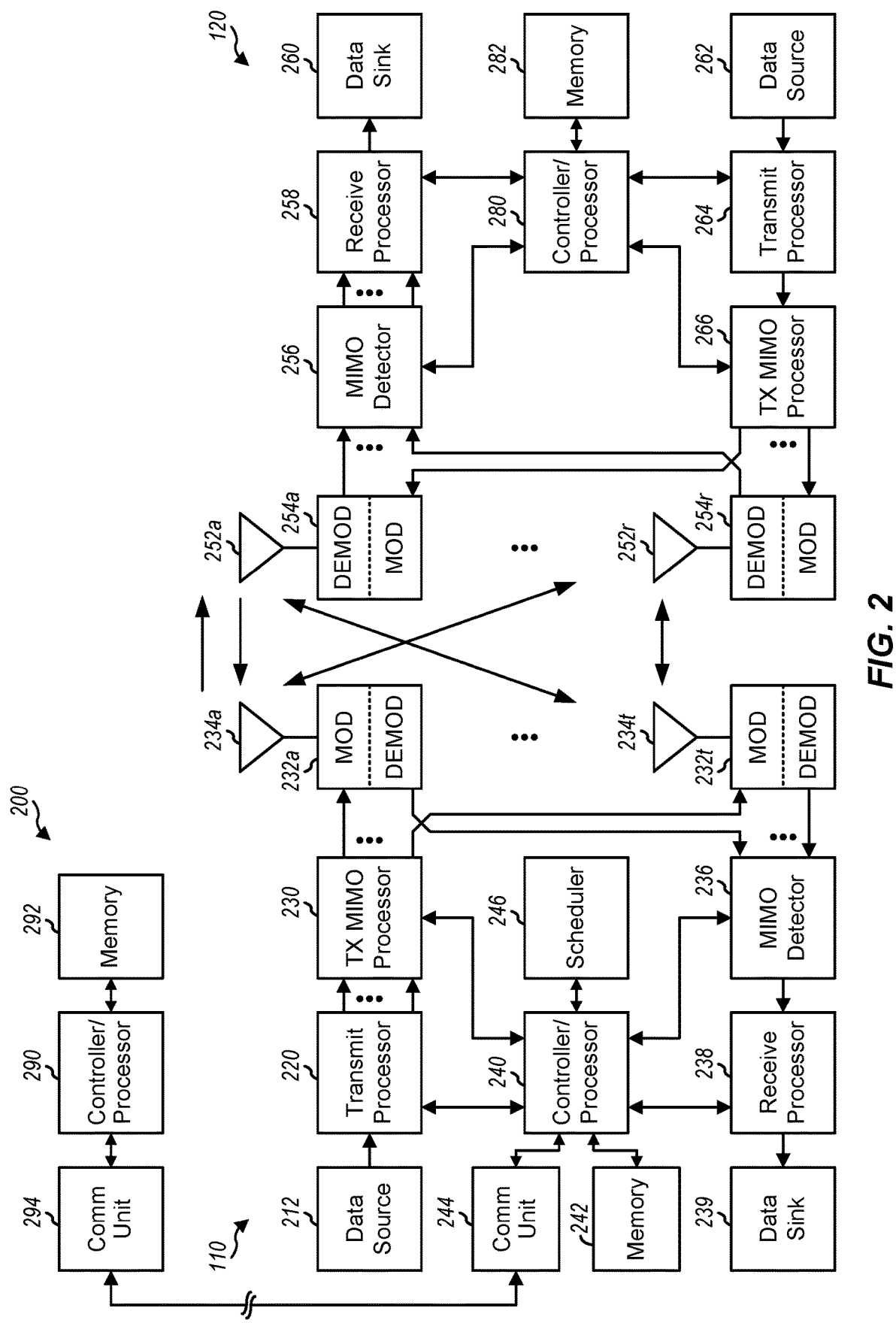
FIG. 2 is a block diagram conceptually illustrating an example of an evolved NodeB (eNB) in communication with a user equipment (UE) in a wireless communications network, in accordance with certain aspects of the present disclosure.

FIG. 2 is a block diagram 200 of a design of an eNB 110 and UE 120, which may be one of the eNBs 110 and UEs 120, respectively, in FIG. 1.

At eNB 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNB 110 and/or other eNBs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to eNB 110. At eNB 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. eNB 110 may include communication unit 244 and communicate to network controller 130 via communication unit 244. Network controller 130 may include communication unit 294, controller/processor 290, and memory 292.

Controllers/processors 240 and 280 may direct the operation at eNB 110 and UE 120, respectively. For example, controller/processor 240 and/or other processors and modules at eNB 110 may perform or direct operations 700 and/or other processes for the techniques described herein. Similarly, controller/processor 280 and/or other processors and modules at UE 120 may perform or direct operations 600 and/or processes for the techniques described herein. Memories 242 and 282 may store data and program codes for eNB 110 and UE 120, respectively.

For example, one or more of the receive processor 258, controller/processor 280, transmit processor 264, and/or memory 282 may be configured to identify at least one narrowband region within a wider system bandwidth and determine resources assigned to the UE for transmitting symbols of a physical uplink channel in the narrowband region that are multiplexed with symbols transmitted by one or more other UEs. One or more of the antenna 252 and MOD 254 may be configured to transmit the physical uplink channel using the identified resources.

One or more of the transmit processor 220, TX MIMO processor 230, controller/processor 240, scheduler 246, receiver processor 238 and/or memory 242 may be configured to identify at least one narrowband region within a wider system bandwidth and assign resources to a user equipment (UE) for transmission of symbols of a physical uplink channel in the narrowband region that are multiplexed with symbols transmitted by one or more other UEs. One or more of the antenna 232 and DEMOD 232 may be configured to receive, from the UE, the physical uplink channel using the identified resources.

Figure 3:
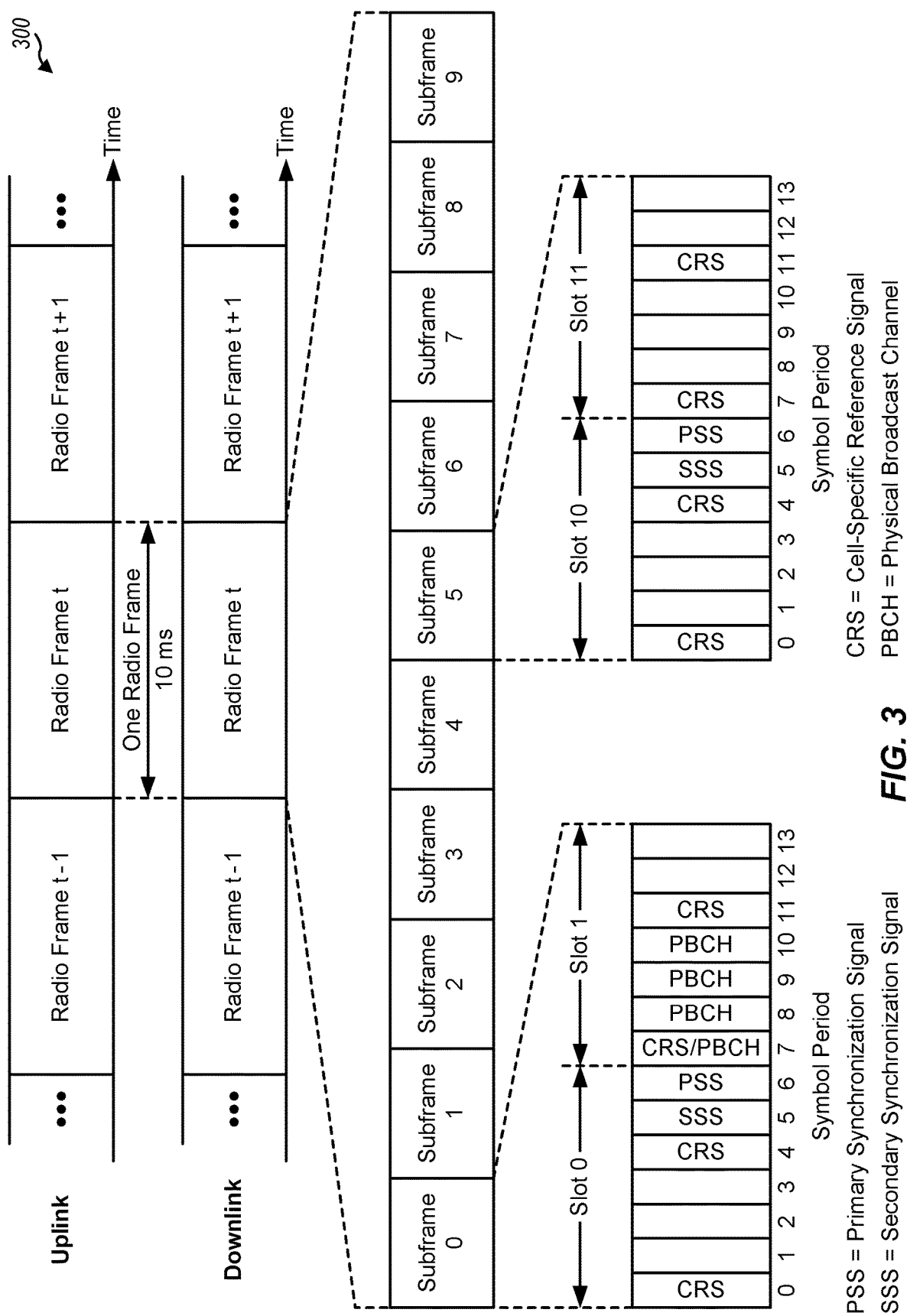
FIG. 3 illustrates an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
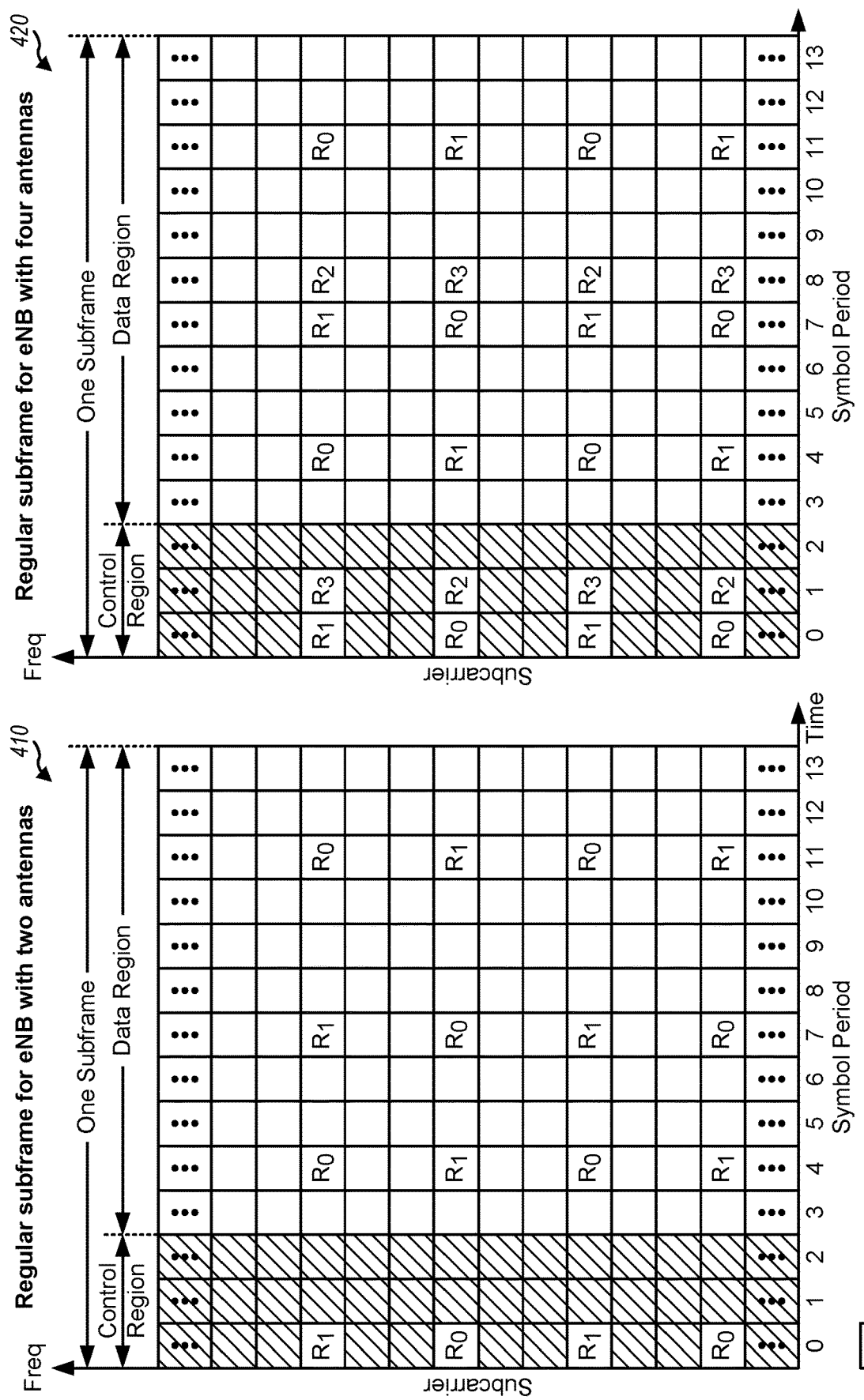
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks (RBs). Each RB may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget. However, low cost, low rate devices need to be supported as well.

Thus, as described above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE (e.g., MTC, eMTC UE) may be limited to a particular narrowband assignment within an available system bandwidth. However, the LC UE may be able to retune to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may able to monitor and/or receive paging messages that non-LC UEs may not able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example Multi-User Multiplexing Frame Structure

For reasons described herein, aspects of the present disclosure provide a new frame structure for eMTC UEs which advantageously supports multi-user multiplexing. eMTC UEs often communicate with a limited set of resources, for example, using only a narrowband region of overall system bandwidth. This narrowband region may range in size, for example, from 6 resource blocks (RBs) to a single RB or less (where each RB may cover 12 subcarriers (tones) in one slot of a subframe and may include a number of resource elements). As eMTCs use a limited set of resources, multiplexing multiple eMTC UEs may present challenges. For example, the limited resources used by these UEs also mean that there are limited resources available to share for multiplexing multiple eMTC UEs.

Some systems, for example, in LTE Rel-13, introduce coverage enhancements (CEs) and support for eMTC, as well as other UEs. As used herein, the term CE generally refers to any type of mechanism that extends the coverage range of a device (such as an eMTC device) within a network. One approach for CE includes bundling which refers to transmitting the same data multiple times. Transmitting the same data multiple times may refer to transmitting the same data across multiple subframes or transmitting the same data across multiple symbols within a same subframe.

Certain systems may provide MTC UEs with coverage enhancements of up to 15 dB, which maps to 155.7 dB maximum coupling loss between the UE and an eNB. Accordingly, eMTC UEs and eNBs may perform measurements at low SNRs (e.g., −15 dB to −20 dB). In some systems, coverage enhancements may include channel bundling, wherein messages associated with eMTC UEs may be bundled (e.g., repeated across multiple subframes or repeated across multiple symbols within a same subframe). In certain systems, eMTC UEs may support narrowband operation while operating in a wider system bandwidth. For example, an eMTC UE may transmit and receive in a narrowband region of a wider system bandwidth. As noted above, the narrowband region may span 6 RBs to a single RB or less.

Figure 5:
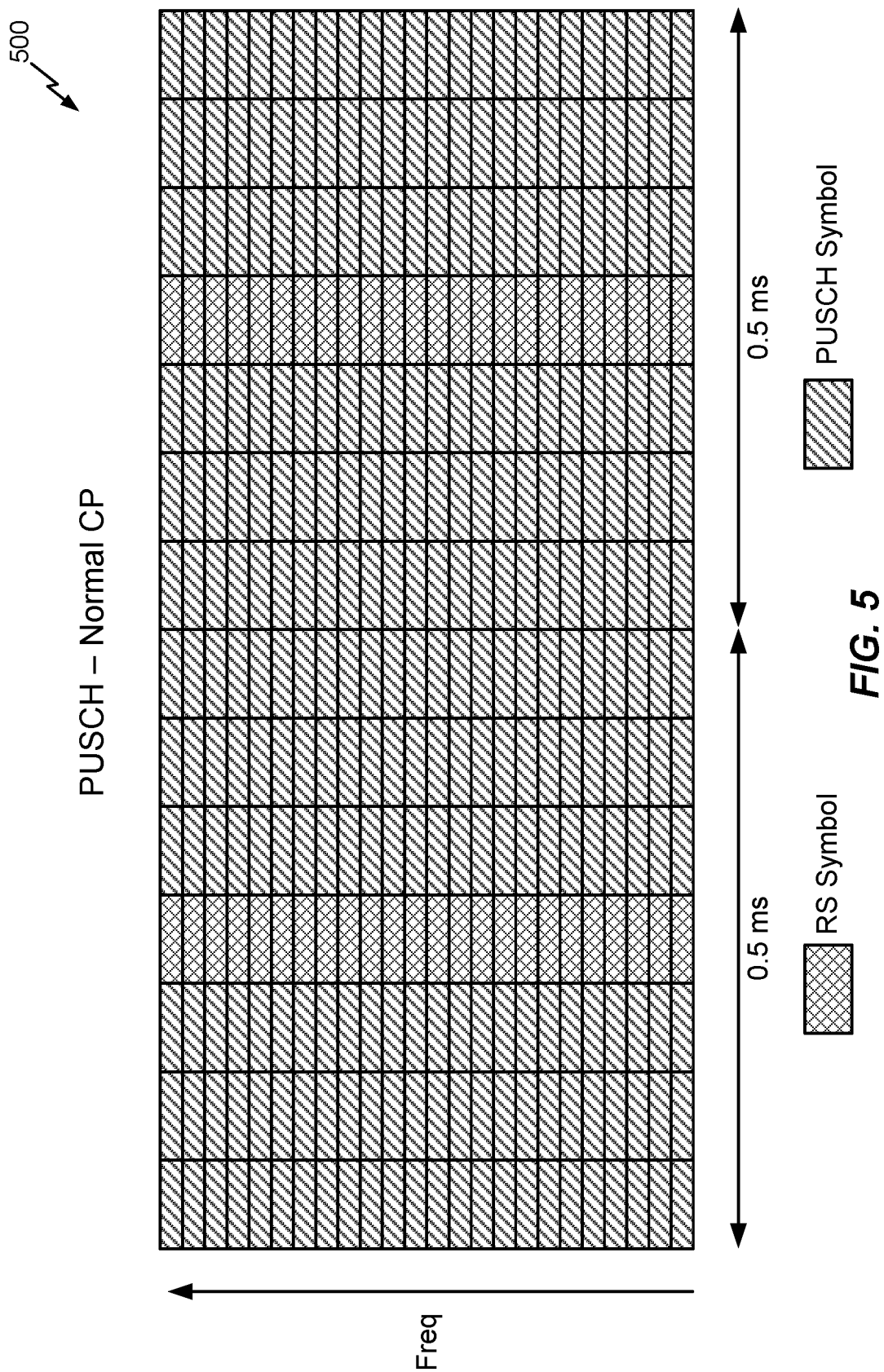
FIG. 5 illustrates an example uplink frame structure, in accordance with certain aspects of the present disclosure.

FIG. 5 illustrates an example frame structure 500 for a physical uplink shared channel. In this example, a first UE may use dedicated RBs (e.g., RBs dedicated to that UE). Accordingly, other UEs may not be multiplexed in those RBs (dedicated to the first UE) for transmitting to a single eNB.

In the illustrated frame structure 500, the first UE may occupy certain RBs and may not perform frequency hopping. As illustrated, the first UE may transmit reference signals (RS) using two symbols (one RS in each of the 0.5 slots) and the first UE may transmit PUSCH using the remaining symbols. In some scenarios (not illustrated in FIG. 5), a shortened PUSCH format may be used, for example, when a last symbol of the PUSCH frame structure 500 is used for a sounding reference signal (SRS) transmission. When a last symbol of the PUSCH frame structure is used for a SRS, the number of available PUSCH symbols may be decreased by one. Accordingly, the UE may transmit RS symbols using two symbols (one RS in each of the 0.5 ms slots of the subframe of the frame 500), a SRS using one symbol of the frame 500, and PUSCH using the remaining symbols of the frame 500.

According to current agreements, PUSCH transmissions may be bundled for eMTC UEs. Bundling PUSCH transmissions means that the PUSCH transmissions may be repeated over multiple subframes and/or over multiple symbols within a same subframe. The bundling size, which may refer to the number of repetitions, may depend on CE levels. According to aspects, more repetitions may correspond to a greater CE. Unfortunately, bundling may reduce a UE's overall capacity as resources are used by the UE for repeating messages.

In some instances, cross-subframe frequency hopping between subbands for PUSCH may be supported for an uplink channel for eMTC devices. Cross-subframe frequency hopping between subbands may refer to the use of different frequency resources by a UE in different subframes (e.g., different frequency resources used by the UE across subframes). For example, an eMTC device may transmit symbols on the PUSCH using a first frequency in a first subframe and may subsequently hop to a different frequency to transmit symbols on the PUSCH using a second frequency in a second subframe. Support for cross-subframe frequency hopping may indicate how many times hopping is allowed by an eMTC UE, how long each eMTC UE may remain on a frequency, and/or support of slot-based frequency hopping for PUSCH. Slot-based frequency hopping may refer to a device retuning from a first frequency in a first slot of a subframe to a second frequency in a second slot of the same subframe to transmit symbols on the PUSCH.

As described above, an eMTC UE may operate in a narrowband region within a wider system bandwidth. In certain scenarios, the eMTC UE may operate in a narrowband region that spans a single RB. A "one RB" eMTC design may present challenges for supporting multiple users. As described above, it may be difficult to share the limited frequency resources of a single RB among multiple users. In an effort to support multiple users, UEs may use a fraction of the single RB. Each UE may be assigned a single tone or a few tones of the RB, rather than each UE being assigned an entire RB. However, use of a fraction of a single RB diverges from current LTE numerology and may cause a loss in frequency diversity.

Therefore, aspects of the present disclosure provide a new frame structure for eMTC UEs which advantageously supports user multiplexing by allocating different parameters (which indicate, for example, different spreading codes, cyclic shifts, spreading factors, and/or hopping patterns) for use in uplink transmissions using shared resources. As described herein, a UE may determine (e.g., be assigned) at least one parameter indicating one or more of a spreading code, cyclic shift, spreading factor, and/or hopping pattern to use for uplink transmission. The frame structure which supports multi-user multiplexing described herein, advantageously, may be implemented in a "one RB" eMTC design and/or a fractional RB design (e.g., wherein each UE may be assigned a fraction of an RB such as a single tone).

Figure 6:
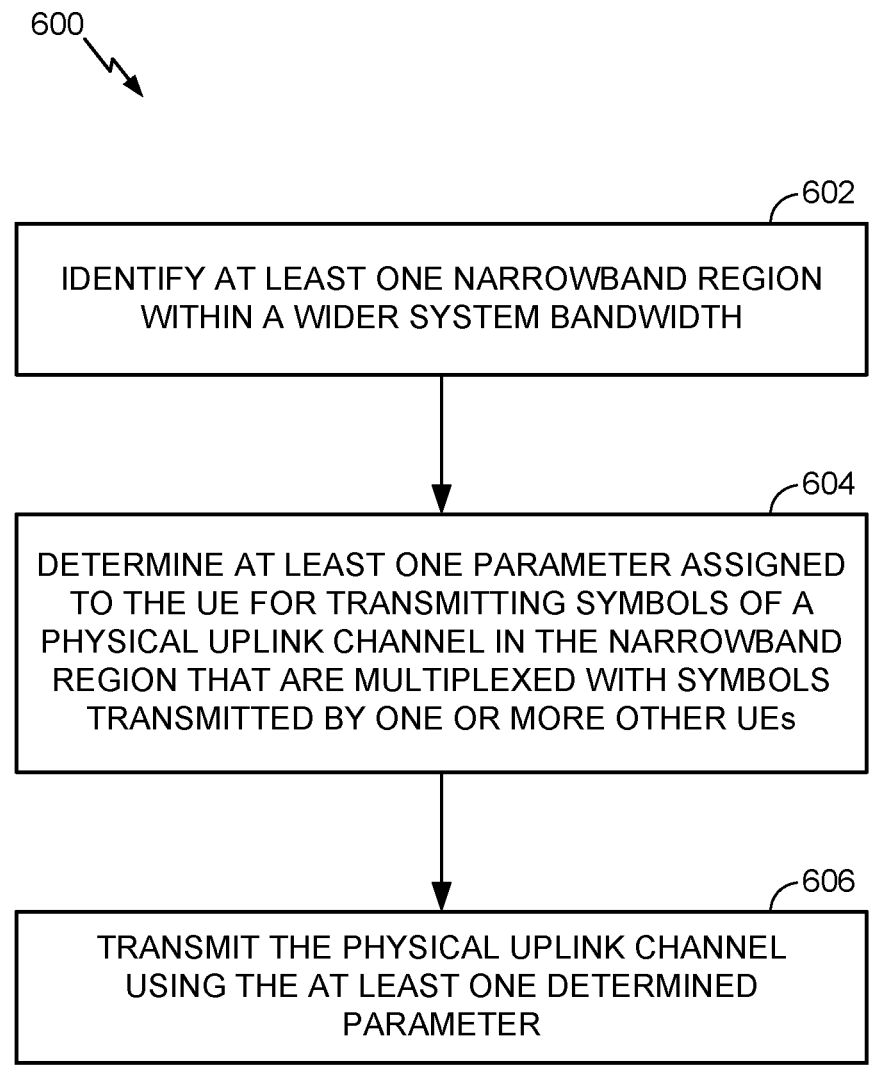
FIG. 6 illustrates an exemplary operation for wireless communications performed by a UE, in accordance with certain aspects of the present disclosure.

FIG. 6 illustrates example operations 600 which may be performed by a UE, according to aspects of the present disclosure. UE 120a, 120b, and/or 120c in FIG. 1 which may include one or more modules of UE 120 in FIG. 2 may be configured to perform the operations described herein. For example, one or more of the receive processor 258, transmit processor 264, controller/processor 280, memory 282, antenna 252 and/or demodulator/modulators 254 of the UE 120 may perform the operations described herein.

At 602, the UE may identify at least one narrowband region within a wider system bandwidth. At 604, the UE may determine at least one parameter assigned to the UE for transmitting symbols of a physical uplink channel in the narrowband region that are multiplexed with symbols transmitted by one or more other UEs. At 606, the UE may transmit the physical uplink channel using the at least one determined parameter. A parameter may indicate one or more of a cyclic shift, spreading code, spreading factor (which refers to the length of a spreading code), a subframe hopping pattern, or a slot-based hopping pattern to be used by the UE for UL transmissions.

Figure 7:
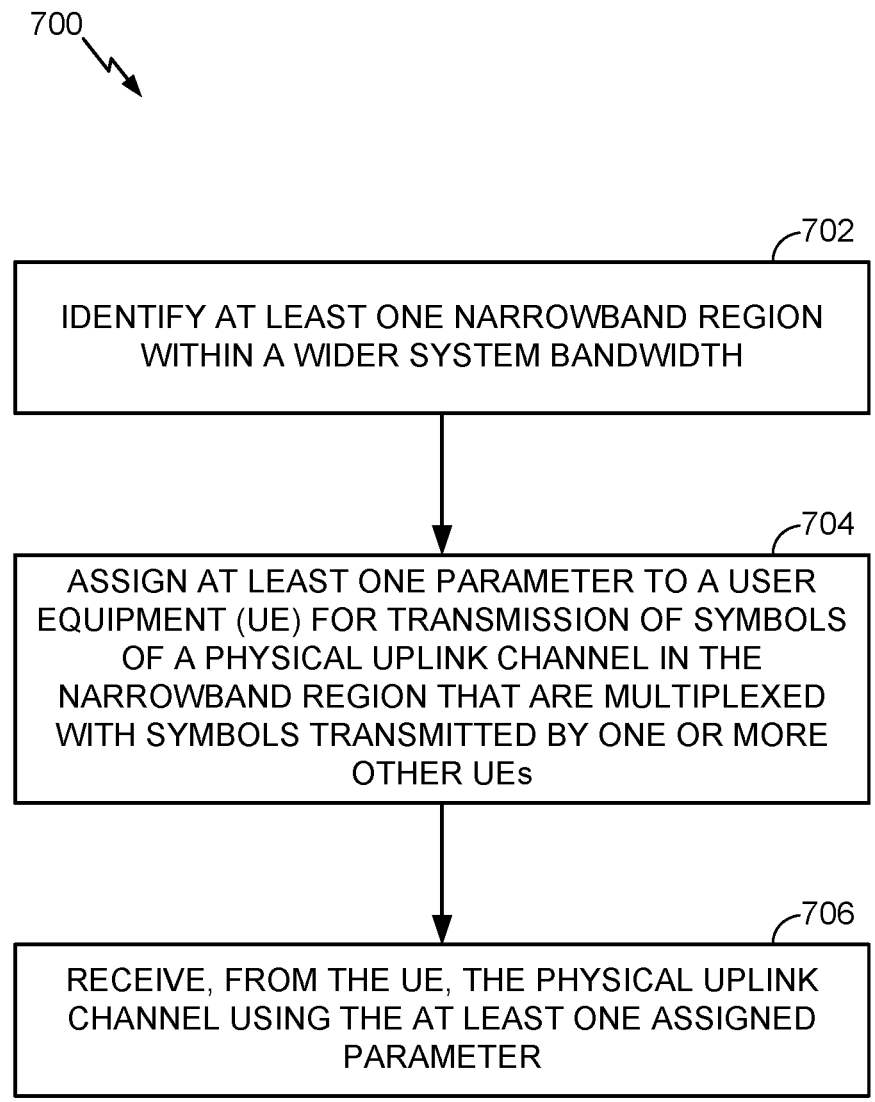
FIG. 7 illustrates an exemplary operation for wireless communications performed by an eNB, in accordance with certain aspects of the present disclosure.

FIG. 7 illustrates example operations 700 which may be performed by an eNB, according to aspects of the present disclosure. eNB 110a, 110b, 110c, and/or 110d in FIG. 1 which may include one or more modules of eNB 110 in FIG. 2 may be configured to perform the operations described herein. For example, one or more of the transmit processor, 220, receive processor 238, controller/processor 240, memory 242, antenna 234 and/or demodulator/modulators 232 of the eNB 110 may perform the operations described herein.

At 702, the eNB may identify at least one narrowband region within a wider system bandwidth. As noted above, the narrowband regions may span from one to six RBs. At 704, the eNB may assign at least one parameter to a UE for transmission of symbols of a physical uplink channel in the narrowband region that are multiplexed with symbols transmitted by one or more other UEs. At 706, the eNB may receive, from the UE, the physical uplink channel using the at least one assigned parameter.

In order to allocate uplink resources of a narrowband frequency region, such as a single RB narrowband region, to multiple users, the resources of the narrowband region can be multiplexed among the multiple users. Further, in order to maintain orthogonality of transmissions from different UEs within the narrowband region, the eNB may assign different cyclic shifts (e.g., different shifted Chu sequences) or spreading codes to the UEs. The UE may apply the assigned cyclic shift or spreading codes to their respective transmissions. By assigning different cyclic shifts, transmissions from different eMTC UEs using the same frequency resources may be orthogonal in the frequency domain. By assigning different spreading codes, transmissions from different eMTC UEs using the same set of symbols or subframes may be orthogonal in the time domain. In some cases, a combination of spreading codes and cyclic shifts may be used by UEs in an effort to support multiple users.

According to aspects, data symbols from eMTC UEs may be multiplexed using spreading codes (orthogonal covers) over multiple symbols in the time domain. As described herein, a configurable spreading factor (SF) may be used, where the term spreading factor generally refers to the length of the spreading code. In other words, the spreading factor may refer to the number of times the spreading code is to be applied to a repeated transmission. A "1" of the spreading code may correspond to a non-inverted version of a transmission and a "−1" of the spreading code may correspond to an inverted version of the transmission.

According to aspects, RS symbols from eMTC UEs may be multiplexed using spreading with orthogonal covers in the time domain, applying a cyclic shifts in frequency domain, or a combination of both spreading using orthogonal covers and applying cyclic shifts.

Figure 8:
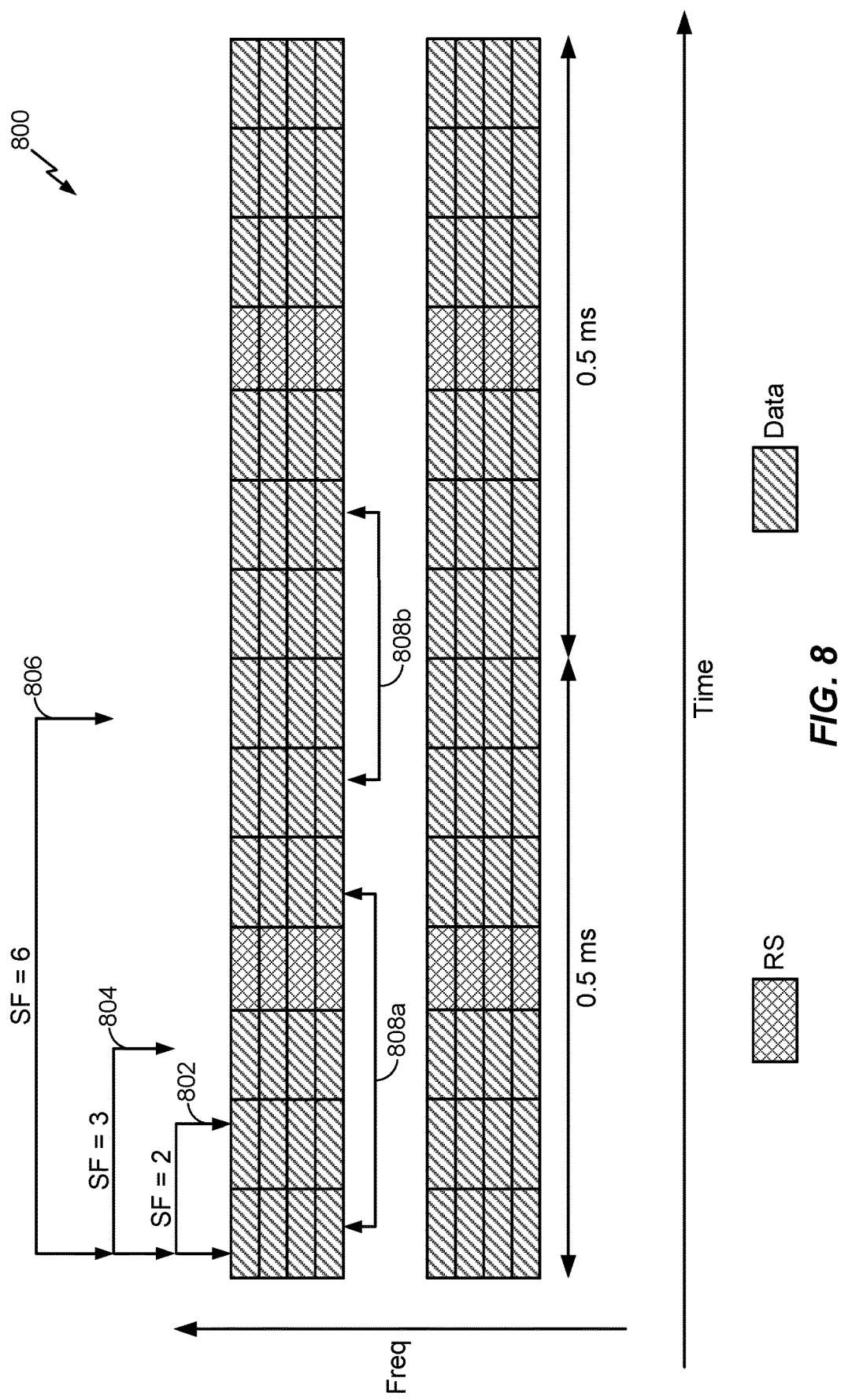
FIG. 8 illustrates an example frame structure for multi-user multiplexing, according to aspects of the present disclosure.

FIG. 8 illustrates an example frame structure 800 for multi-user multiplexing, according to aspects of the present disclosure. When no spreading factor is used, the SF=1. When the SF=1, each symbol will be different.

In an effort to support user multiplexing, data symbols of the frame 800 may be spread over multiple symbols, where spreading codes may be used to transmit data symbols over N adjacent symbols periods. A UE may multiply data symbols by a code sequence (spreading code) of length N and transmit the data symbols on a specific subcarrier for the next N OFDM symbols. The spreading codes used by the UEs may be configured by an eNB and known by a receiver. The spreading codes may be used by an eNB to receive data from multiple UEs using a same time-frequency resource. In this manner, the multi-user multiplexing described herein may increase user capacity.

Referring back to FIG. 8, groups of two data symbols may be spread using a SF=2, as shown at 802. Groups of three data symbols may be spread using SF=3, as shown at 804. Groups of six data symbols may be spread using SF=6, as shown at 806. In general, the number of devices (e.g. UEs) that may be multiplexed using different spreading codes relates to the length of spreading codes and the corresponding number of orthogonal combinations. For example, with SF=2, spreading codes [1,1] and [1,−1] result in orthogonal transmissions after each transmission from a different UE is multiplied with one of these codes. Accordingly, when SF=2 for a group of two data symbols, transmissions from up to two different UEs for the group of data symbols may be supported. As another example, with SF=4, spreading codes [1, 1, 1, 1], [1, 1, −1, −1], [1, −1, 1, −1], and [1, −1, −1, 1] result in orthogonal transmissions after each transmission from up to four UEs is multiplied with one of these codes. In other words, when SF=4 for a group of four data symbols, orthogonal transmissions from up to four different UEs may be supported. Accordingly, a longer spreading code may support more orthogonal transmissions, wherein the orthogonal transmissions may be from different users. As described above, a SF=2 may support orthogonal transmissions from two users and a SF=4 may support orthogonal transmissions from four users. In this manner, a longer spreading code (e.g., associated with a larger spreading factor) may support multiplexed orthogonal transmissions from a larger number of UEs. For a normal subframe (e.g., as illustrated in FIG. 8) with 12 data symbols, a SF=1, 2, 3, 4, 6, and/or 12 may be used.

For RS symbols, a SF=2 may be used in the time domain, wherein Hadamard codes may be used over two RS symbols. Alternatively, for RS symbols, cyclic shifts may be used for separation per reference signal symbol in the frequency domain. For SF=4, 6, or 12, cyclic shifts may be applied for separation per reference signal symbol. Alternatively, a 2×2, 3×2, or 6×2 combination of time and frequency multiplexing may be used for reference signal symbols.

For data symbols in a normal subframe, a Hadamard code may be used for SF=2 (e.g., as shown at 802) and SF=4 (e.g., as shown at 808). A SF=4 may result in cross-slot spreading. According to cross-slot spreading, the first set of four data symbols 808a may use a first set of frequency resources and the second set of four data symbols 808b may use a second set of frequency resources. As shown in FIG. 8, the set of four data symbols 808b may span the first and second slot of the subframe 800. Therefore, a SF=4, which would use cross-slot frequency hopping, may not be viable if slot-based frequency hopping is enabled (where frequency hopping refers to using different frequency resources in different time slots of the same subframe). Accordingly, it may not be desirable for an eMTC UE to use SF=4 if slot-based frequency hopping is not enabled. Alternatively, for data symbols in a normal subframe, a DFT matrix may be used to support SF=3, 6, and 12.

Figure 9:
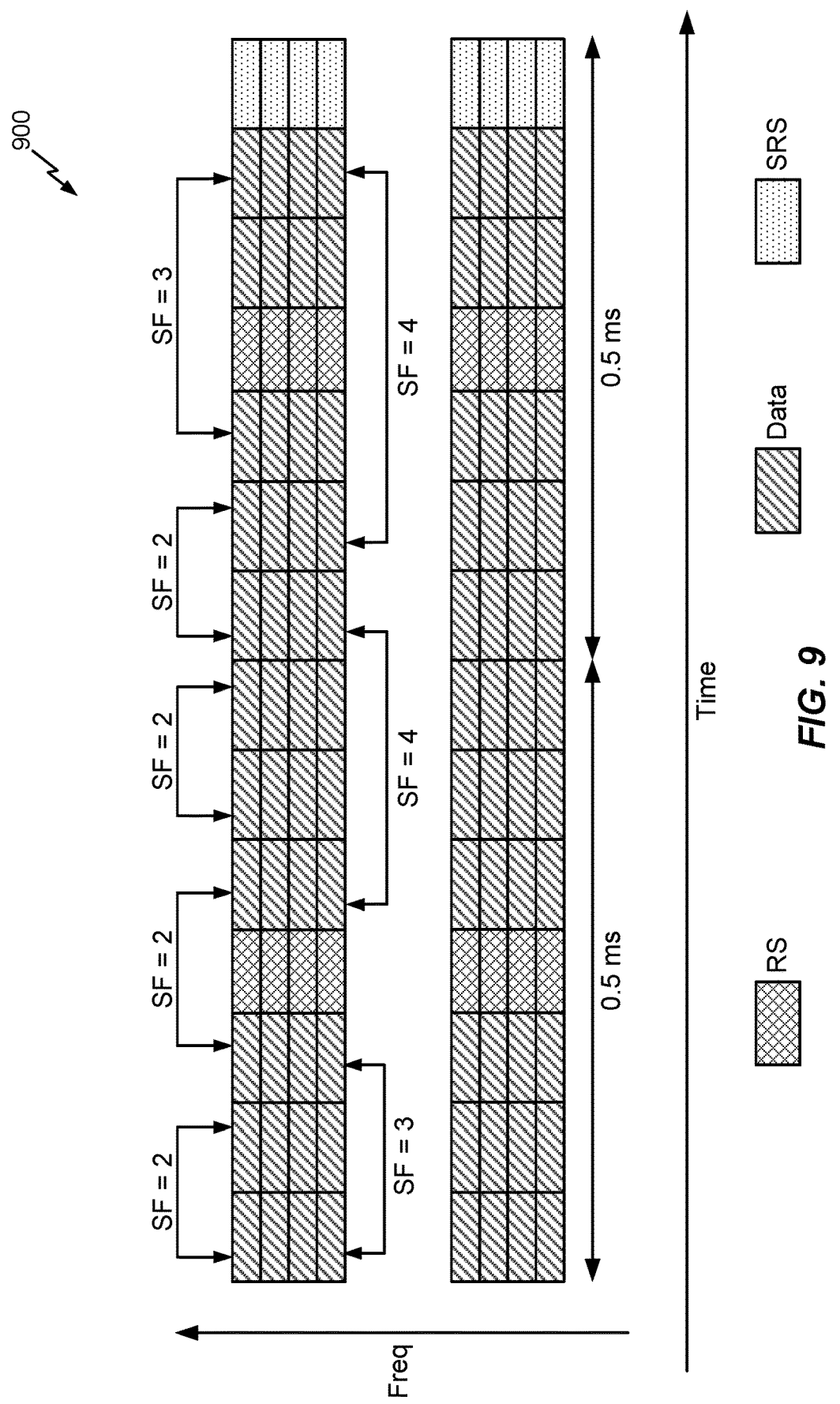
FIG. 9 illustrates an example subframe format which supports uplink multi-user multiplexing, in accordance with aspects of the present disclosure.

FIG. 9 illustrates an example subframe format 900, which supports uplink multi-user multiplexing, in accordance with aspects of the present disclosure. According to a first possibility, the SF may support orthogonal transmissions by two users, using two different spreading codes that result in orthogonal transmissions. For example, SF=2 and SF=3 may be used to support two users in the shortened subframe format. As illustrated in FIG. 9, out of the 11 data symbols in a shortened subframe format, 8 data symbols may be transmitted using SF=2 and 3 data symbols may be transmitted with SF=3 (SF=2 may be used to transmit 4 sets of 2 data symbols and SF=3 may be used to transmit one set of 3 data symbols).

According to a second possibility, the SF format 900 may support orthogonal transmission by three users, using three different spreading codes that result in orthogonal transmissions. For example, SF=3 and SF=4 may be used to support three users. As illustrated in FIG. 9, out of 11 data symbols in a shortened subframe format, 3 data symbols may be transmitted with SF=3 and 8 data symbols may be transmitted with SF=4 (SF=3 may be used to transmit the first 3 data symbols and SF=4 may be used to transmit two sets of 4 data symbols).

According to a third possibility (not illustrated in FIG. 9), the SF may support 5 users (e.g., with at least five different spreading codes that result in orthogonal transmissions). For example, SF=5 and SF=6 may be used to support 5 users. Out of the 11 data symbols in the shortened subframe format, 5 data symbols may be transmitted using SF=5 and 6 data symbols may be transmitted using SF=6.

According to a fourth possibility (also not illustrated in FIG. 9), the SF may support 11 users. For example, SF=11 may be used. The 11 data symbols in the shortened subframe format may be transmitted using SF=11.

According to aspects, a retuning time for a UE to tune from one frequency to another for cross-slot or cross-subframe multiplexing may not destroy orthogonality between the multiplexed UEs. For cross-subframe frequency hopping, a SF=2 or 3 may be supported.

According to a first option for cross-subframe frequency hopping, the first symbols (e.g., 2 or 3 symbols) in a first slot of a next subframe may be dropped (e.g., not used for UL transmission). For a shortened subframe, a SF=2 may be used and the first 2 symbols in the first slot of the next subframe may be dropped.

According to a second option for cross-subframe frequency hopping, the last symbols (e.g., 2 or 3 symbols) in the last slot of the current subframe (e.g., assuming the UE hops from a current subframe to a next subframe) may be dropped (e.g., not be used for UL transmission by the UE).

According to aspects, retuning for cross-subframe frequency hopping may occur during a last one or more symbols of the first subframe, a first one or more symbols of the second subframe, or a combination of symbols from the first and second subframe. In this manner, retuning for cross-subframe frequency hopping may occur during at least one of a last one or more symbols of the first subframe or a first one or more symbols of the second subframe.

For slot-based frequency hopping, a SF=2 or 3 may be used. According to an example, the first symbols (e.g., 2 or 3 symbols) of the second slot of a next subframe or the last symbols (e.g., 2 or 3 symbols) in the first slot of the subframe may be dropped.

Multi-user multiplexing on an uplink channel, may advantageously increase user capacity. This may be especially important in the 1 RB eMTC design which, as described above, has limited dimensions. Furthermore, the increased user capacity using 1 RB may provide an alternative design to a fractional RB design and may remain consistent with LTE numerology. Additionally, a flexible SF may be used for balancing user capacity and data rates for the multiple UEs.

Aspects of the present disclosure advantageously provide an improved tracking loop with eNB scheduling support. For example, a SF may be greater than 1, which may support more than one user. However, the eNB may only schedule a single user even though the SF is greater than 1. For example, the SF may be 2 and the eNB may only schedule a single UE. The eNB may use the repetition of the received data symbols from the single UE in an effort to improve the tracking loop. The eNB may cross-correlate the repeated, spread symbols to estimate the frequency offset.

Compared to cross-subframe spreading, aspects of the present disclosure may provide better orthogonality due to, for example, a shorter spreading period across symbols (as opposed to across subframes). For example, the spreading period may be shorter (e.g., 2 symbols) using aspects described herein. A shorter spreading period may allow for better orthogonalities as compared to spreading across subframes. In cross-subframe hopping, the channel may need to remain the same within the spreading period and groups of users may need to hop at a same time, in an effort to maintain orthogonalities. Advantageously, spreading within a subframe may allow users to hop frequencies independently. Additionally, aspects of the present disclosure may not reduce a data rate or transport block (TB) size because spreading may be considered to reshuffle data symbols across multiple subframes. The TB size determination may take into account SF and bundling and may be easily scaled. Therefore, a user capacity may increase without reduction of a data rate.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

According to aspects, one or more components of the UE and/or eNB may perform the means described and recited herein. For example, one or more of the receive processor 258, controller/processor 280, transmit processor 264, and/or memory 282 may be configured to identify at least one narrowband region within a wider system bandwidth and determine resources assigned to the UE for transmitting symbols of a physical uplink channel in the narrowband region that are multiplexed with symbols transmitted by one or more other UEs. One or more of the antenna 252 and MOD 254 may be configured to transmit the physical uplink channel using the identified resources.

One or more of the transmit processor 220, TX MIMO processor 230, controller/processor 240, scheduler 246, receiver processor 238 and/or memory 242 may be configured to identify at least one narrowband region within a wider system bandwidth and assign resources to a user equipment (UE) for transmission of symbols of a physical uplink channel in the narrowband region that are multiplexed with symbols transmitted by one or more other UEs. One or more of the antenna 232 and DEMOD 232 may be configured to receive, from the UE, the physical uplink channel using the identified resources.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    identifying at least one narrowband region, comprising six resource blocks (RB) or less, within a wider system bandwidth;
    determining a cyclic shift assigned to the UE to multiplex symbols of a physical uplink channel transmitted by the UE in the narrowband region with symbols transmitted by one or more other UEs in the narrowband region with at least a different cyclic shift; and
    transmitting the symbols of the physical uplink channel in the narrowband region using the determined cyclic shift and using time-frequency resources also used by the one or more other UEs in the narrowband region.

2. The method of claim 1, wherein:
    transmitting the physical uplink channel comprises applying the cyclic shift to transmit reference signals (RSs) in one or more symbols of the physical uplink channel.

3. The method of claim 2, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises the spreading code; and
    transmitting the physical uplink channel further comprises applying the spreading code to transmit reference the signals (RSs) in multiple symbols of the physical uplink channel.

4. The method of claim 1, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading code; and
    wherein transmitting the physical uplink channel comprises applying the spreading code to transmit reference signals (RSs) in multiple symbols of the physical uplink channel.

5. The method of claim 1, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading code; and
    transmitting the physical uplink channel comprises applying the spreading code to transmit data symbols in multiple symbols of the physical uplink channel.

6. The method of claim 1, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a configurable spreading factor (SF) based, at least in part, on a format of a subframe of the physical uplink channel, a bundling size, or a coverage enhancement (CE) level; and
    wherein transmitting the physical uplink channel comprises applying the SF to transmit multiple symbols of the physical uplink channel.

7. The method of claim 1, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor (SF);
    the determining further comprises identifying a subframe hopping pattern; and
    transmitting the physical uplink channel comprises applying the SF to transmit the physical uplink channel using a first frequency in a first subframe and subsequently using a second frequency in a second subframe within the narrowband region, the first and second frequencies determined based on the subframe hopping pattern.

8. The method of claim 7, wherein the SF is based, at least in part, on a time to retune from the first frequency to the second frequency.

9. The method of claim 8, wherein the retuning from the first frequency to the second frequency may occur during at least one of a last one or more symbols of the first subframe or a first one or more symbols of the second subframe.

10. The method of claim 1, wherein:
    the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor (SF);

the determining further comprises identifying a slot-based hopping pattern; and transmitting the physical uplink channel comprises applying the SF to transmit the physical uplink channel on a first frequency in a first slot of a subframe and subsequently on a second frequency in a second slot of the subframe within the narrowband region, the first and second frequencies determined based on the slot-based hopping pattern.

11. The method of claim 10, wherein the SF is based, at least in part, on a time to retune from the first frequency to the second frequency within the subframe.

12. The method of claim 1, wherein transmitting the physical uplink channel comprises applying a spreading code to transmit one of: reference signals (RSs) or data symbols in multiple symbols of a subframe of the physical uplink channel or across multiple subframes of the physical uplink channel.

13. The method of claim 1, wherein:
the determining further comprising determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor equal to or greater than 1; and only the UE is scheduled for transmission on a resource block on the physical uplink channel.

14. A method for wireless communications by an evolved Node B (eNB), comprising:
identifying at least one narrowband region, comprising six resource blocks (RB) or less, within a wider system bandwidth;

assigning a cyclic shift to a user equipment (UE) to multiplex symbols of a physical uplink channel transmitted by the UE in the narrowband region with symbols transmitted by one or more other UEs in the narrowband region with at least a different cyclic shift; and receiving, from the UE, the symbols of the physical uplink channel in the narrowband region using the assigned cyclic shift and, using time-frequency resources also used by the one or more other UEs in the narrowband region.

15. The method of claim 14, wherein:
receiving the physical uplink channel comprises receiving reference signals (RSs) with the cyclic shift applied in one or more symbols of the physical uplink channel.

16. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading code; and receiving the physical uplink channel comprises receiving reference signals (RSs) with the spreading code applied in multiple symbols of the physical uplink channel.

17. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading code; and receiving the physical uplink channel comprises receiving data symbols with the spreading code applied in multiple symbols of the physical uplink channel.

18. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a configurable spreading factor (SF) based, at least in part, on a format of a subframe of the physical uplink channel, a bundling size, or a coverage enhancement (CE) level; and receiving the physical uplink channel comprises receiving multiple symbols of the physical uplink channel with the SF applied.

19. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor (SF);

the assigning further comprises assigning a subframe hopping pattern; and receiving the physical uplink channel comprises receiving the physical uplink channel with the SF applied on a first frequency in a first subframe and subsequently on a second frequency in a second subframe within the narrowband region, the first and second frequencies determined based on the subframe hopping pattern.

20. The method of claim 19, wherein the SF is based, at least in part, on a time for the UE to retune from the first frequency to the second frequency.

21. The method of claim 20, wherein the retuning from the first frequency to the second frequency may occur during at least one of a last one or more symbols of the first subframe or a first one or more symbols of the second subframe.

22. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor (SF);

the assigning further comprises identifying a slot-based hopping pattern; and receiving the physical uplink channel comprises receiving the physical uplink channel with the SF applied on a first frequency in a first slot of a subframe and subsequently on a second frequency in a second slot of the subframe within the narrowband region, the first and second frequencies determined based on the slot-based hopping pattern.

23. The method of claim 22, wherein the SF is based, at least in part, on a time for the UE to retune from the first frequency to the second frequency within the subframe.

24. The method of claim 14, wherein receiving the physical uplink channel comprises receiving one of reference signals (RSs) or data symbols in multiple symbols of a subframe of the physical uplink channel or across multiple subframes of the physical uplink channel with a spreading code applied.

25. The method of claim 14, wherein:
the assigning further comprising assigning a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading factor (SF) equal to or greater than 1; and
further comprising scheduling only the UE for transmission on a resource block on the physical uplink channel.

26. An apparatus for wireless communications by a user equipment (UE), comprising:
means for identifying at least one narrowband region, comprising six resource blocks (RB) or less, within a wider system bandwidth;
means for determining a cyclic shift assigned to the UE to multiplex symbols of a physical uplink channel transmitted by the UE in the narrowband region with symbols transmitted by one or more other UEs in the narrowband region with at least a different cyclic shift; and
means for transmitting the symbols of the physical uplink channel in the narrowband region using the determined cyclic shift and using time-frequency resources also used by the one or more other UEs in the narrowband region.

27. The apparatus of claim 26, wherein:
wherein the means for transmitting the physical uplink channel comprises means for applying the cyclic shift to transmit reference signals (RSs) in one or more symbols of the physical uplink channel.

28. The apparatus of claim 26, wherein:
the means for determining further comprising means for determining a spreading parameter assigned to the UE to multiplex the symbols of the physical uplink channel transmitted by the UE in the narrowband region with the symbols transmitted by the one or more other UEs in the narrowband region with at least a different spreading parameter, wherein the spreading parameter comprises a spreading code; and
the means for transmitting the physical uplink channel comprises means for applying the spreading code to transmit reference signals (RSs) in multiple symbols of the physical uplink channel.

29. An apparatus for wireless communications by an evolved Node B (eNB), comprising:
means for identifying at least one narrowband region, comprising six resource blocks (RB) or less, within a wider system bandwidth;
means for assigning a cyclic shift to a user equipment to multiplex-symbols of a physical uplink channel transmitted by the UE in the narrowband region with symbols transmitted by one or more other UEs in the narrowband region with at least a different cyclic shift; and
means for receiving, from the UE, the symbols of the physical uplink channel in the narrowband region using the assigned at least one assigned parameter cyclic shift and using time-frequency resources also used by the one or more other UEs in the narrowband region.

30. The apparatus of claim 29, wherein:
the means for receiving the physical uplink channel comprises means for receiving reference signals (RSs) with the cyclic shift applied in one or more symbols of the physical uplink channel.

* * * * *